US012722583B2

(12) United States Patent
Hwang et al.

(10) Patent No.: US 12,722,583 B2
(45) Date of Patent: Sep. 1, 2026

(54) WIRE GUIDE FOR AIRBAG

(71) Applicants: Hyundai Motor Company, Seoul (KR); Kia Corporation, Seoul (KR)

(72) Inventors: Ji Su Hwang, Yongin-Si (KR); Kyeong Boo Roh, Hwaseong-Si (KR); Byung Woo Noh, Seoul (KR); Yu Ji Son, Hwaseong-Si (KR); Seung Min Kim, Bucheon-Si (KR); Won-Seuk Lee, Hwaseong-Si (KR); Ho-Jun Sung, Hwaseong-Si (KR); Young-Jae Lee, Hwaseong-Si (KR); Yeong-Seong Yun, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 374 days.

(21) Appl. No.: 18/520,433

(22) Filed: Nov. 27, 2023

(65) Prior Publication Data

US 2024/0190367 A1 Jun. 13, 2024

(30) Foreign Application Priority Data

Dec. 8, 2022 (KR) ........................ 10-2022-0170404

(51) Int. Cl.

| | |
|---|---|
| ***B60R 16/027*** | (2006.01) |
| ***B60R 16/02*** | (2006.01) |
| ***B60R 21/01*** | (2006.01) |
| ***B60R 21/203*** | (2006.01) |

(52) U.S. Cl.

CPC ........ *B60R 16/027* (2013.01); *B60R 16/0215* (2013.01); *B60R 21/01* (2013.01); *B60R 21/2037* (2013.01); *B60R 2021/01006* (2013.01)

(58) Field of Classification Search

CPC ... B60R 16/027; B60R 16/0215; B60R 21/01; B60R 21/2037; B60R 2021/01006

USPC ........................................................... 439/15

See application file for complete search history.

(56) References Cited

U.S. PATENT DOCUMENTS

| | | | | |
|---|---|---|---|---|
| 7,500,867 | B1 * | 3/2009 | Doglio | H01R 13/5841 439/456 |
| D606,848 | S * | 12/2009 | Jimenez | D8/395 |
| 8,061,861 | B2 | 11/2011 | Paxton et al. | |
| 8,382,513 | B2 * | 2/2013 | Kobayashi | F24S 25/61 439/507 |
| 8,925,959 | B2 | 1/2015 | Bosch et al. | |

(Continued)

FOREIGN PATENT DOCUMENTS

| | | |
|---|---|---|
| JP | H08-249933 | 9/1996 |
| JP | 2018-074774 | 5/2018 |

(Continued)

*Primary Examiner* — Harshad C Patel

(74) *Attorney, Agent, or Firm* — MORGAN, LEWIS & BOCKIUS LLP

(57) ABSTRACT

A wire guide for an airbag includes a first connection portion connected to a wire harness, a second connection portion connected to a branch wire branching off from the wire harness, and an elastic portion connecting the first and second connection portions and provided to be elastically deformable, in which a cross-section of the wire guide is formed in a '⊃' shape, and the wire guide limits an installation route for the branch wire that transmits power and a control signal to a lighting emblem module provided on an airbag cover that accommodates an airbag module therein.

15 Claims, 5 Drawing Sheets

(56) References Cited

U.S. PATENT DOCUMENTS

| | | | | |
|---|---|---|---|---|
| D754,964 | S * | 5/2016 | Hernandez | D3/207 |
| 10,208,874 | B2 * | 2/2019 | Geiger | H02S 30/00 |
| D875,515 | S * | 2/2020 | Pretorius | D8/394 |
| 10,773,673 | B2 * | 9/2020 | Bachmann | B60R 21/203 |
| 10,777,984 | B1 * | 9/2020 | Elbert | H01R 11/01 |
| 10,847,960 | B1 * | 11/2020 | Naugler | H02G 3/32 |
| 11,378,111 | B2 * | 7/2022 | Kuhl | F16B 7/22 |
| 2014/0220834 | A1 * | 8/2014 | Rizzo | H01R 4/64<br>439/834 |
| 2016/0066473 | A1 * | 3/2016 | Tsuboi | B60R 16/0215<br>361/699 |
| 2021/0247002 | A1 * | 8/2021 | Dallmann | H02G 3/32 |

FOREIGN PATENT DOCUMENTS

| | | |
|---|---|---|
| KR | 10-1076195 | 10/2011 |
| KR | 10-1718689 | 3/2017 |
| KR | 10-2005738 | 7/2019 |

* cited by examiner

WIRE GUIDE FOR AIRBAG

CROSS-REFERENCE TO RELATED APPLICATION

The present application claims priority to Korean Patent Application No. 10-2022-0170404, filed on Dec. 8, 2022, the entire contents of which is incorporated herein for all purposes by this reference.

BACKGROUND OF THE PRESENT DISCLOSURE

Field of the Present Disclosure

The present disclosure relates to an airbag device, and more particularly, to a wire guide for an airbag that limits an installation route for a wire for supplying power to an airbag module and a lighting emblem provided in a steering wheel and transmitting a control signal.

Description of Related Art

A driver seat airbag device applied to a vehicle is widely used to protect an occupant accommodated in a driver seat from impact occurring in the event of a vehicle collision.

In general, the driver seat airbag device is mounted in a steering wheel and includes an inflator, an airbag cushion, a housing configured to accommodate the airbag cushion in a folded state, and a cover configured to cover an opening of the housing.

In the event of a vehicle collision, the airbag cushion is inflated by gas injected from the inflator. When an opening is formed in the cover as the cover made of soft resin is fractured by an expansive force of the airbag cushion, the airbag cushion is inflated toward the occupant in the vehicle through the opening.

Such a driver seat airbag device may be provided with a cover having a decorative plate which is called an emblem.

For example, airbag cover technologies in general are included below.

Meanwhile, the emblem is typically a design or mark of a company. The emblem in the vehicle does not simply refer to the manufacturer, but serves to impart a value to the vehicle that the emblem represents.

Emblems are provided in various locations on the exterior and interior of the vehicle, and provide the credibility value represented by the emblem. The locations where these emblems are provided depend on the vehicle manufacturers. Most emblems are provided on the rear side of the vehicle and the front side of the steering wheel.

That is, the emblem is provided on an airbag cover that covers an armature provided at a center of the steering wheel used by the occupant to steer and drive the vehicle.

In general, an emblem having no lighting function is applied to the airbag cover in the related art.

For the present reason, even though the airbag cover may be identified by natural light during the daytime, the airbag cover in the related art is difficult to identify at night because of a lack of light amount, which causes a problem in that the airbag cover cannot exhibit the function thereof.

To solve the above-mentioned problems, technologies for applying lighting to emblems is generally disclosed.

Meanwhile, the emblem with the lighting function (hereinafter, referred to as a 'lighting emblem') includes a substrate, housing, and the like.

Because the lighting emblem needs to receive power and control signals for operating an LED, a connector is provided on the substrate, and the connector is coupled to a counterpart connector connected, through a wire, to a controller for operating the lighting emblem.

However, because an airbag module made by assembling the airbag cushion and the inflator is accommodated in the airbag cover, a space is very narrow, and the airbag cover is pressed to operate a horn.

Therefore, generally, an external surface of a wire, which is connected to the lighting emblem, is taped with a tape (cotton tape) made of a fabric material to protect the wire. However, there is a limitation in preventing damage to the wire caused by friction, which occurs when the airbag cover is operated to operate the horn, and vibration or impact transmitted from the outside thereof.

The damage to the wire causes malfunctions or inoperability of the lighting emblem.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a wire guide for an airbag that limits an installation route for a wire that transmits power and control signals to a lighting emblem applied to an airbag cover.

Various aspects of the present disclosure are also directed to providing a wire guide for an airbag, which is configured for preventing damage to or breakage of a wire and suppressing the occurrence of noise.

Various aspects of the present disclosure are also directed to providing a wire guide for an airbag, which is configured for improving workability during a process of assembling an airbag module and a lighting emblem module mounted in a steering wheel.

To achieve the above-mentioned objects, various aspects of the present disclosure are directed to providing a wire guide for an airbag, the wire guide including: a first connection portion connected to a wire harness; a second connection portion connected to a branch wire branching off from the wire harness; and an elastic portion connecting the first and second connection portions and provided to be elastically deformable, in which a cross-section of the wire guide is formed in a '⊃' shape, and the wire guide limits an installation route for the branch wire that transmits power and a control signal to a lighting emblem module provided on an airbag cover that accommodates an airbag module therein.

According to wire guide for an airbag according to an exemplary embodiment of the present disclosure described above, the wire guide may be connected and fixed to the wire harness and the branch wire, constantly limiting the installation route for the wire for transmitting the power and control signal to the lighting emblem module.

Therefore, according to an exemplary embodiment of the present disclosure, it is possible to prevent damage to or breakage of the wire and the occurrence of noise by suppressing the inadvertent movement of the wire which may be caused when vibration or impact occurs while the vehicle travels or when the airbag cover is operated to operate the horn.

Furthermore, according to an exemplary embodiment of the present disclosure, the airbag cover assembly provided in the hub of the steering wheel and the wire harness may be easily mounted, improving workability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
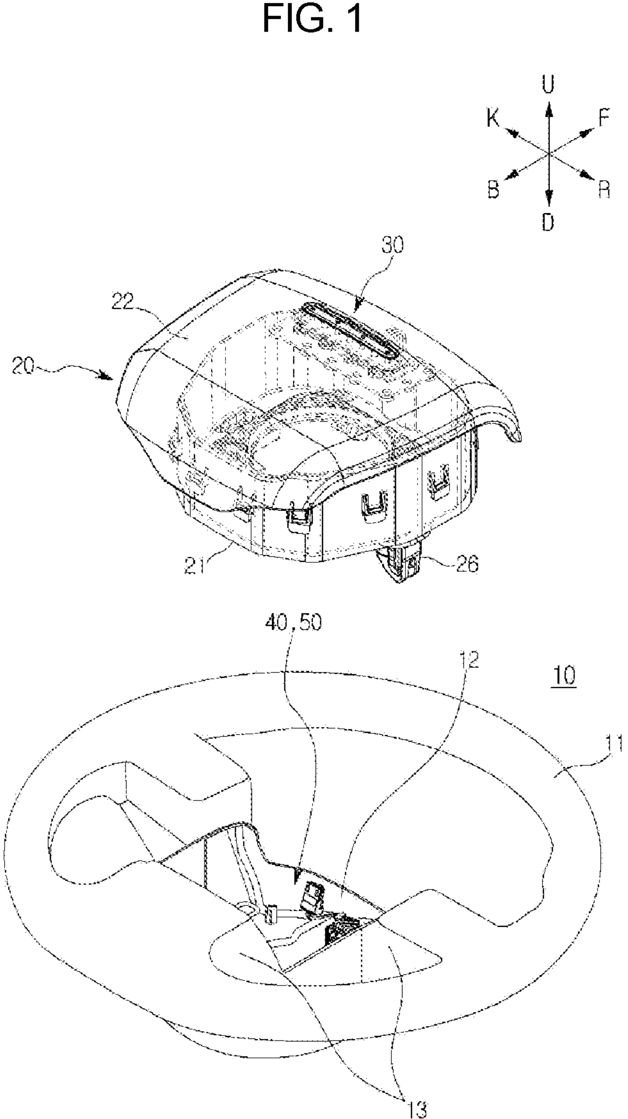
FIG. 1 is an exploded perspective view of a steering wheel to which a wire guide for an airbag according to various exemplary embodiments of the present disclosure is applied.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a wire guide for an airbag according to various exemplary embodiments of the present disclosure will be described in detail with reference to the accompanying drawings.

First, a configuration of an airbag cover assembly and a configuration of a steering wheel to which a wire guide for an airbag is applied will be described in detail with reference to FIG. 1.

Figure 2:
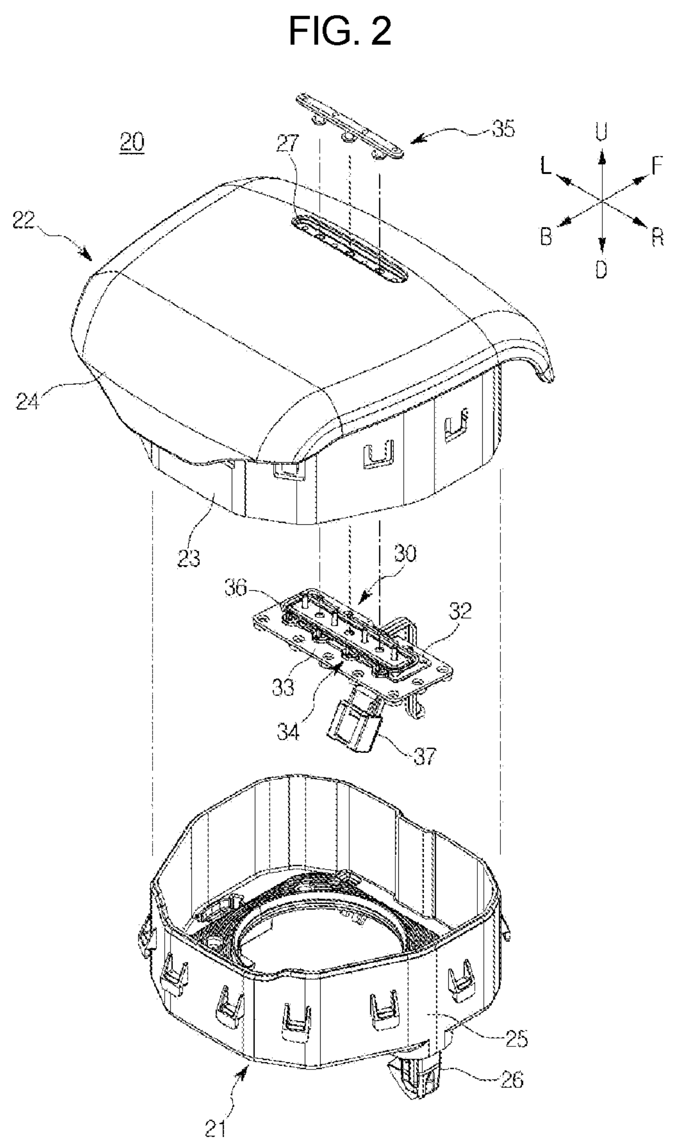
FIG. 2 is an exploded perspective view of an airbag cover assembly illustrated in FIG. 1.

FIG. 1 is an exploded perspective view of a steering wheel to which a wire guide for an airbag according to various exemplary embodiments of the present disclosure is applied, and FIG. 2 is an exploded perspective view of an airbag cover assembly illustrated in FIG. 1.

Hereinafter, based on an airbag cover mounted on the steering wheel in FIG. 1, a direction toward a driver is defined as a 'rearward direction (R)', and a direction opposite to the rearward direction is defined as a 'forward direction (F)'. Furthermore, the terms indicating directions, such as 'left (L),''right (R),' 'upward (U),' and 'downward (D)', are defined as indicating the directions based on the forward and rearward directions.

As illustrated in FIG. 1 and FIG. 2, a steering wheel 10 to which a wire guide for an airbag according to various exemplary embodiments of the present disclosure is applied includes a rim portion 11 used to steer a traveling direction of a vehicle, a hub 12 provided at a center portion of the rim portion 11 and provided with an airbag cover assembly 20 configured to accommodate an airbag module (not illustrated in the drawing) therein, and spokes 13 configured to connect the rim portion 11 and the hub 12.

The airbag cover assembly 20 includes an airbag housing 21 mounted in the steering wheel 10 in a state in which the airbag module is accommodated, an airbag cover 22 coupled to an upper portion of the airbag housing, and a lighting emblem module 30 provided on the airbag cover 22 and configured to provide a lighting emblem function by emitting light to the outside of the airbag cover 22.

The airbag housing 21 is formed in an approximately container shape opened at an upper side thereof, and the airbag cover 22 is formed in an approximately container shape opened at a lower side thereof. Therefore, the airbag housing 21 may be coupled to an opened lower portion of the airbag cover 22.

The airbag cover 22 includes a sidewall portion 23 extending toward the steering wheel 10, and an upper plate 24 configured to close an upper end portion of the sidewall portion 23 and cover the airbag module (not illustrated in the drawing) accommodated therein.

A cross-section of the sidewall portion 23 is formed in a container shape including various shapes such as a circular shape, an elliptical shape, or a quadrangular shape to correspond to a coupling space formed in an upper surface of the steering wheel. An airbag housing 21, which accommodates the airbag module, may be coupled to a lower portion of the sidewall portion 23.

A leather cover may be provided on an upper surface of the upper plate 24, a tear line, which is torn by expansion of the airbag cushion, may be formed on the upper surface of the upper plate 24.

In the instant case, a sidewall 25 of the airbag housing 21 may include a size and shape corresponding to an internal space of the sidewall portion 23 so that the sidewall 25 of the airbag housing 21 may be coupled to the sidewall portion 23 of the airbag cover 22.

Furthermore, a plurality of coupling protrusions 210 may be provided on the sidewall 25 of the airbag housing 21 and coupled to a plurality of coupling holes 220 provided in the sidewall portion 23 of the airbag cover 22.

For example, a cross-section of the coupling hole is formed in an approximately 'U' shape. The coupling protrusion may correspond to a shape of each of the coupling holes and include a hook shape protruding outwardly from the upper end portion toward the lower end portion.

Furthermore, a mounting hole 230, in which an inflator (not illustrated in the drawing) is mounted, is formed in a center portion of a lower surface of the airbag housing 21. One or more coupling hooks 26 may be formed on or coupled to a lower surface of the airbag housing 21 so that the airbag housing 21 may be coupled to the hub 12 of the steering wheel 10.

The lighting emblem module 30 may include a printed circuit board (hereinafter, referred to as a 'PCB') 32 on which a plurality of LEDs is provided, a PCB housing 33 including an upper surface on which the PCB 32 is accommodated, and a diffuser 34 provided on an upper portion of the PCB 32 and configured to close upper sides of the plurality of LEDs and the PCB 32 and transmit light beams, which are emitted from the respective LEDs, upward while preventing the light beams from being mixed or intersecting.

Furthermore, the lighting emblem module 30 may further include a decoration member 35 provided in an installation groove 27 formed in an upper surface of the airbag cover 22, and a coupling plate 36 coupled to an upper portion of the diffuser 34 and coupled to the decoration member 35.

Of course, the present disclosure is not necessarily limited thereto. It should be noted that the configuration of the lighting emblem module 30 may be variously modified.

Furthermore, the lighting emblem module 30 may further include a lighting connector 37 configured to transmit power and control signals to the PCB, and the lighting connector 37 may be coupled to the airbag housing 21.

The lighting connector 37 is coupled to a connector 43 provided on a wire harness 40 that electrically connects the airbag module and a controller (not illustrated in the drawing) configured to control an operation of the lighting emblem module 30. The lighting connector 37 is configured to transmit the control signal and power to the PCB 32. The lighting connector 37 may be coupled to the lower surface of the airbag housing 21 by the coupling member so that an angle of the lighting connector 37 may be adjusted (see FIG. 5 and FIG. 6).

Because the lighting connector 37 provided on the lighting emblem module 30 is coupled to the lower surface of the airbag housing 21 as described above, the operator couples the connector 43 of a wire, which branches off from the wire harness 40 to be connected to the lighting emblem module 30, to the lighting connector 37.

Generally, an external surface of a wire is taped with a tape made of a fabric material to prevent breakage of or damage to the wire and suppress the occurrence of noise caused by vibration or impact applied in the airbag cover assembly 20. However, there is a limitation in preventing damage to or breakage of the wire and reducing noise even though the wire is taped.

To solve the present problem, in an exemplary embodiment of the present disclosure, a wire guide 50 is applied to limit a route along which the wire branching off from the wire harness 40 is provided.

Figure 3:
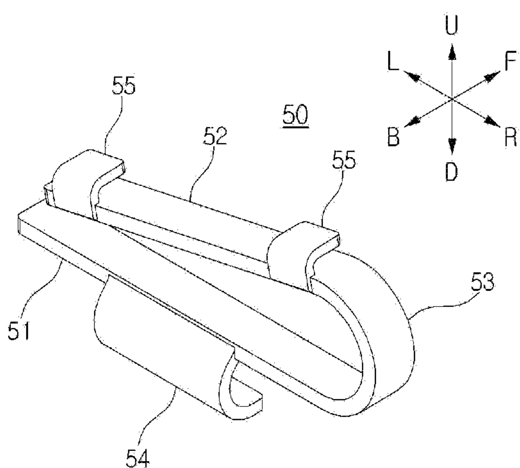
FIG. 3 is a perspective view of the wire guide for an airbag according to the exemplary embodiment of the present disclosure.
Figure 4:
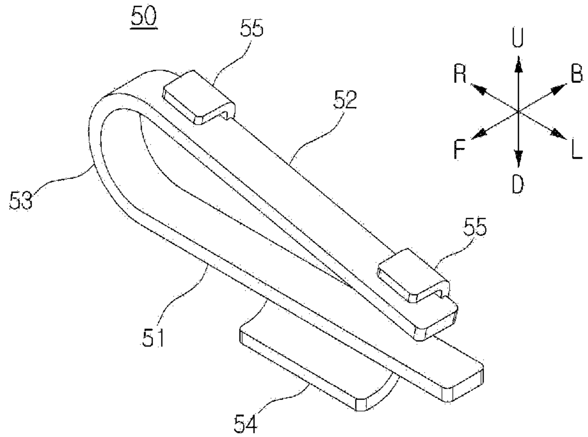
FIG. 4 is a perspective view exemplarily illustrating the wire guide illustrated in FIG. 3 when viewed from another angle.
Figure 5:
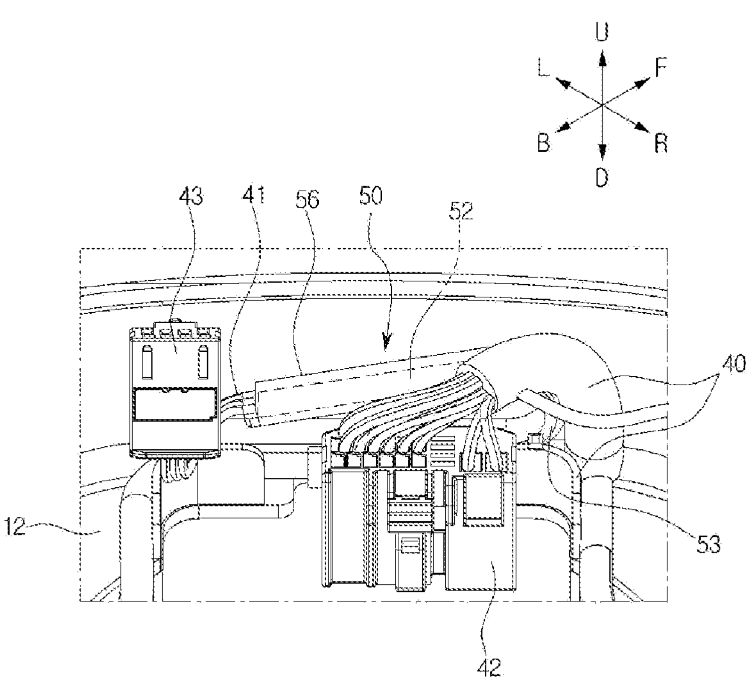
FIG. 5 and FIG. 6 are views states in which the wire guide illustrated in FIG. 3 is provided in a steering wheel.
Figure 6:
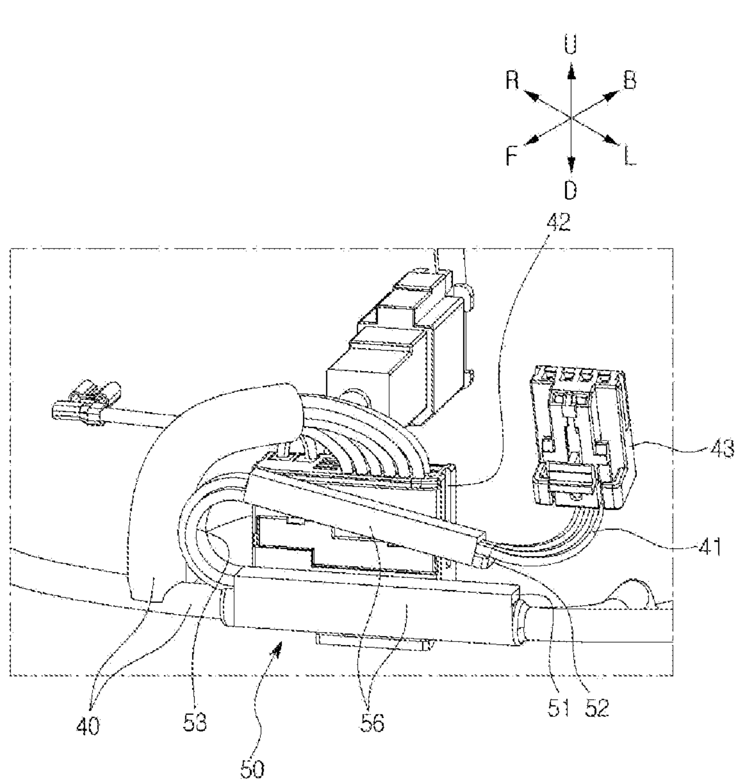

FIG. 3 is a perspective view of the wire guide for an airbag according to the exemplary embodiment of the present disclosure, FIG. 4 is a perspective view exemplarily illustrating the wire guide illustrated in FIG. 3 when viewed from another angle, and FIG. 5 and FIG. 6 are views states in which the wire guide illustrated in FIG. 3 is provided in the steering wheel.

As illustrated in FIG. 3, FIG. 4, FIG. 5 and FIG. 6, the wire guide 50 for an airbag according to the exemplary embodiment of the present disclosure includes a first connection portion 51 connected to the wire harness 40, a second connection portion 52 connected to the wire (hereinafter, referred to as a 'branch wire') 41 branching off from the wire harness 40, and an elastic portion 53 configured to connect the first connection portion 51 and the second connection portion 52 and provided to be elastically changeable.

That is, a cross-section of the wire guide 50 may be formed in an approximately '⊃' shape.

The first connection portion 51 is fixedly connected to the wire harness 40, and the second connection portion 52 is fixedly connected to the branch wire 41 branching off from the wire harness 40. Therefore, one end portion of the branch wire 41 may be connected to the wire harness 40, and the connector 43, which is connected to the lighting connector 37 of the lighting emblem module 30, may be provided at the other end portion of the branch wire 41.

In the instant case, a main connector 42 connected to the controller may be provided at one end portion of the wire harness 40, a plurality of wires may branch off from the other end portion of the wire harness 40, and the branching wires may be respectively connected, through connectors, to multifunctional switches provided on the lighting emblem module 30, the inflator of the airbag module, and the steering wheel.

In an exemplary embodiment of the present disclosure, the wire harness 40, in a state made before the plurality of wires branches off from the wire harness 40, and the wire 41, which branches off from the wire harness 40 to be connected to the lighting emblem module 30, will be described in detail, and a description of the other branch wires will be omitted.

As illustrated in FIG. 5 and FIG. 6, the wire harness 40 may be fixed by a fixing member to a wall portion provided in the hub 12 of the steering wheel 10. In contrast, a separate process of fixing the branch wire 41 is not performed. For the present reason, the wire 41 is inadvertently moved by vibration or impact, which occurs while the vehicle travels, or an operation of the airbag cover 22 performed to operate the horn, and the inadvertent movement of the wire 41 interferes with the wall portion of the hub 12, which causes damage to the wire and the occurrence of noise.

With reference back to FIG. 3 and FIG. 4, the elastic portion 53 may be provided to be elastically deformed to facilitate the process of assembling the connector 43 and the lighting connector 37.

To the present end, the wire guide 50 may be manufactured by use of a synthetic resin material such as plastic or rubber which is elastically deformable.

Of course, the wire guide 50 may be manufactured by use of an elastically deformable metallic material. However, the exemplary embodiment will be described in which the wire guide 50 includes a synthetic resin material to prevent a situation in which the wire guide 50 is separated from the wire harness 40 and the branch wire 41 and scatters when the airbag cushion is inflated and deployed, which causes an injury to the occupant.

Furthermore, the first and second connection portions 51 and 52 may each include a thickness greater than a thickness of the elastic portion 53. Therefore, the first and second connection portions 51 and 52 may each be maintained to have predetermined rigidity, whereas the elastic portion 53 may be easily and elastically deformed when being pulled by the operator.

Of course, the elastic portion 53 may have predetermined rigidity so that the elastic portion 53 is elastically deformed only by the pulling operation of the operator and maintained to include an original shape when external vibration is applied or the airbag cover 22 is operated to operate the horn.

In the instant case, a first fixing piece 54 may be provided on the first connection portion 51 and surround and fix the wire harness 40, and a pair of second fixing pieces 55 may be provided on the second connection portion 52 and surround and fix the branch wire 41.

The first and second fixing pieces 54 and 55 may be formed to be curved or bent upward and forward from rear end portions of the first and second connection portions 51 and 52. Of course, the number of first and second fixing pieces 54 and 55 and positions and shapes in which the first and second fixing pieces 54 and 55 are provided may be variously changed.

That is, the first connection portion 51 may be securely fixed to the wire harness 40 by the first fixing piece 54 in a state in which the wire harness 40 is fixed to the hub 12 by a separate fixing member. Furthermore, the second connection portion 52 is connected to the branch wire 41 by the second fixing pieces 55 so that the installation route for the branch wire 41 may be limited to a state in which the branch wire 41 is in contact with a wall body of the hub 12.

Furthermore, taping portions 56, which are configured by a fabric material or a soft tape, may be respectively provided on external surfaces of the first and second connection portions 51 and 52 in the state in which the first and second connection portions 51 and 52 are respectively connected to the wire harness 40 and the branch wire 41 to prevent abnormal noise caused by vibration.

Therefore, the first and second connection portions 51 and 52 may be respectively maintained in straight bar shapes, and the second connection portion 52 may be rotated toward one end portion connected to the elastic portion 53, i.e., rotated upward about the right end portion by the elastic deformation of the elastic portion 53. An interval between the first and second connection portions 51 and 52 may be adjusted by operation of the elastic portion 53 and the operation of the second connection portion 52.

That is, the operator may easily couple the connector 43 to the lighting connector 37 of the lighting emblem module 30 by pulling the connector 43 provided at the tip portion of the branch wire 41 in the state in which the first and second connection portions 51 and 52 are respectively fixed to the wire harness 40 and the branch wire 41 and taped. In the instant case, the elastic portion 53 is elastically deformed by the pulling operation of the operator. When the pulling operation is released, the elastic portion 53 provides a restoring force to restore the wire guide 50 to the original shape.

As described above, according to an exemplary embodiment of the present disclosure, the wire guide may be connected and fixed to the wire harness and the branch wire, constantly limiting the installation route for the wire for transmitting the power and control signal to the lighting emblem module.

Therefore, according to an exemplary embodiment of the present disclosure, it is possible to prevent damage to or breakage of the wire and the occurrence of noise by suppressing the inadvertent movement of the wire which may be caused when vibration or impact occurs while the vehicle travels or when the airbag cover is operated to operate the horn.

While the present disclosure made by the present inventor has been described above with reference to the exemplary embodiment of the present disclosure, the present disclosure is not limited to the exemplary embodiment and may, of course, be various modified without departing from the scope of the subject matter.

The present disclosure is applied to the technology related to the wire guide for an airbag that limits the installation route for the wire that transmits power and control signals to the lighting emblem module provided in the airbag cover assembly.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A wire guide for an airbag, the wire guide comprising:

a first connection portion connected to a wire harness;

a second connection portion connected to a branch wire branching off from the wire harness; and an elastic portion connecting the first and second connection portions and provided to be elastically deformable, wherein a cross-section of the wire guide is formed in a '⊐' shape, and the wire guide limits an installation route for the branch wire that transmits power and a control signal to a lighting emblem module provided on an airbag cover that accommodates an airbag module therein, wherein the first and second connection portions are each formed in a straight bar shape, and wherein the wire guide further includes first and second fixing pieces respectively provided on the first and second connection portions and surrounding and fixing the wire harness and the branch wire, respectively, wherein the first fixing piece is configured to extend along a longitudinal direction of the first connection portion, and wherein based on that the wire harness and the branch wire are fixed by the first and second fixing pieces, respectively, the wire harness and the branch wire are configured to extend along the longitudinal direction of the first and second connection portions.

2. The wire guide of claim 1, wherein the second connection portion is rotated about one end portion connected to the elastic portion in response to operation of an operator, and wherein when the operation is released, the second connection portion is rotated to return to an original position thereof by a restoring force of the elastic portion.

3. A steering wheel airbag for a vehicle, the steering wheel airbag including the wire guide for the airbag of claim 1.

4. The wire guide of claim 1, wherein the first and second fixing pieces are respectively formed to be curved or bent to surround the wire harness and the branch wire, respectively.

5. The wire guide of claim 1, further comprising taping portions, which are configured by a fabric material or a tape having an elasticity lower than a predetermined elasticity, are respectively provided on external surfaces of the first and second connection portions in a state in which the first and second connection portions are respectively fixed to the wire harness and the branch wire to prevent abnormal noise caused by vibration.

6. The wire guide of claim 1, wherein the first and second connection portions each have a thickness thicker than a thickness of the elastic portion.

7. A wire guide for an airbag, the wire guide comprising:

a first connection portion connected to a wire harness;

a second connection portion connected to a branch wire branching off from the wire harness; and an elastic portion configured to connect the first connection portion and the second connection portion, having elasticity, and configured to limit a spacing distance between the first connection portion and the second connection portion, wherein the branch wire transmits power and a control signal to a lighting emblem module provided on an airbag cover that accommodates an airbag module therein, wherein the first and second connection portions are each formed in a straight bar shape, and wherein the wire guide further includes first and second fixing pieces respectively provided on the first and second connection portions and surrounding and fixing the wire harness and the branch wire, respectively, wherein the first fixing piece is configured to extend along a longitudinal direction of the first connection portion, and wherein based on that the wire harness and the branch wire are fixed by the first and second fixing pieces, respectively, the wire harness and the branch wire are configured to extend along the longitudinal direction of the first and second connection portions.

8. The wire guide of claim 7, wherein the wire guide for an airbag is made of a synthetic resin material, and the first connection portion, the second connection portion, and the elastic portion are integrated.

9. The wire guide of claim 7, wherein the first and second connection portions each have a thickness thicker than a thickness of the elastic portion.

10. The wire guide of claim 7, further including first and second fixing pieces respectively provided on the first and second connection portions and surrounding and fixing the wire harness and the branch wire, respectively.

11. The wire guide of claim 7, further comprising taping portions, which are configured by a fabric material or a tape having an elasticity lower than a predetermined elasticity, are respectively provided on external surfaces of the first and second connection portions in a state in which the first and second connection portions are respectively fixed to the wire harness and the branch wire to prevent abnormal noise caused by vibration.

12. A wire guide for an airbag, the wire guide comprising:

a first connection portion connected to a wire harness;

a second connection portion connected to a branch wire branching off from the wire harness; and an elastic portion configured to connect the first connection portion and the second connection portion, having elasticity, and configured to allow the first connection portion and the second connection portion to be positioned adjacent to each other, wherein the branch wire transmits power and a control signal to a lighting emblem module provided on an airbag cover that accommodates an airbag module therein, wherein the first and second connection portions are each formed in a straight bar shape, and wherein the wire guide further includes first and second fixing pieces respectively provided on the first and second connection portions and surrounding and fixing the wire harness and the branch wire, respectively, wherein the first fixing piece is configured to extend along a longitudinal direction of the first connection portion, and wherein based on that the wire harness and the branch wire are fixed by the first and second fixing pieces, respectively, the wire harness and the branch wire are configured to extend along the longitudinal direction of the first and second connection portions.

13. The wire guide of claim 12, wherein the first and second connection portions each have a thickness thicker than a thickness of the elastic portion.

14. The wire guide of claim 12, wherein the first and second fixing pieces are respectively formed to be curved or bent to surround the wire harness and the branch wire, respectively.

15. The wire guide of claim 12, further comprising taping portions, which are configured by a fabric material or a tape having an elasticity lower than a predetermined elasticity, are respectively provided on external surfaces of the first and second connection portions in a state in which the first and second connection portions are respectively fixed to the wire harness and the branch wire to prevent abnormal noise caused by vibration.

* * * * *